United States Patent [19]
Herriot

[11] Patent Number: 5,862,331
[45] Date of Patent: Jan. 19, 1999

[54] NAME SERVICE SYSTEM AND METHOD FOR AUTOMATIC UPDATING ON INTERCONNECTED HOSTS

[75] Inventor: Robert G. Herriot, Palo Alto, Calif.

[73] Assignee: Sun Microsystems, Inc., Palo Alto, Calif.

[21] Appl. No.: 667,447

[22] Filed: Jun. 21, 1996

[51] Int. Cl.[6] ............................................ G06F 13/00
[52] U.S. Cl. ............................................ 395/200.49
[58] Field of Search ................... 395/200.58, 200.57, 395/200.33, 200.59, 680, 684, 200.32, 200.52, 200.53, 200.56, 200.47, 200.54, 200.73, 200.75, 200.76, 200.49

[56] References Cited

U.S. PATENT DOCUMENTS

| | | | |
|---|---|---|---|
| 5,136,716 | 8/1992 | Harvey et al. ...................... | 395/200.58 |
| 5,289,578 | 2/1994 | Hartheimer et al. ................. | 395/200.3 |
| 5,434,974 | 7/1995 | Loucks et al. ...................... | 395/200.75 |
| 5,452,459 | 9/1995 | Drury et al. ........................ | 395/700 |
| 5,475,819 | 12/1995 | Miller et al. ....................... | 395/200.33 |
| 5,483,652 | 1/1996 | Sudama et al. ...................... | 395/600 |
| 5,577,252 | 11/1996 | Nelson et al. ...................... | 395/670 |
| 5,617,540 | 4/1997 | Civanlar et al. .................... | 395/200.54 |
| 5,642,515 | 6/1997 | Jones et al. ........................ | 395/727 |
| 5,701,462 | 12/1997 | Whitney et al. ..................... | 395/200.59 |
| 5,729,689 | 3/1998 | Allard et al. ....................... | 395/200.58 |
| 5,740,371 | 4/1998 | Wallis ............................... | 395/200.59 |

OTHER PUBLICATIONS

"Odyssey 1.0 Architecture Specification", Ch. 8, pp. 8–1 through 8–16.
"Solaris ONC—Design and Implementation of Transport-Independent RPC", published by Sunsoft Corporation, 1991.
"Solaris ONC—Network Information Service Plus (NIS+)", published by Sunsoft Corporation, 1991.

Solaris ONC+—Network Information Service Plus (NIS+), published by Sunsoft Corporation, 1992.

*Primary Examiner*—Moustafa M. Meky
*Attorney, Agent, or Firm*—Beyer & Weaver, LLP

[57] ABSTRACT

A name service system in a computer network has a program on a master host which includes a name service map containing the names and corresponding network addresses of servers running in the network. The name service system also includes a proto-server residing on all hosts in which a server needing dynamic name service updates runs. The network address in the name service map corresponding to the server's name is the network address of a program called a "proto-server". The proto-server contains a name table having the name and the corresponding actual address of the server. The name table in the proto-server can be updated dynamically, and the proto-server enables multiple instances of similar servers to run on the same host. When a client requests the binding of a server from the name service, the client program determines whether the address returned from the name service map is the binding of the proto-server, and if so the binding in the proto-server's name table is fetched and returned to the client. The system allows the name service to operate as a dynamically updated system even though the name service program on the master host is a static system that must be updated manually.

18 Claims, 3 Drawing Sheets

NAME SERVICE SYSTEM AND METHOD FOR AUTOMATIC UPDATING ON INTERCONNECTED HOSTS

BACKGROUND OF THE INVENTION

1. Field of the Invention

This invention pertains generally to name services for computer networks, and more particularly to name services that are enhanced to provide automatic revision features.

2. Description of the Background Art

With the advent and growth of network computing, name services have become increasingly important. Name services store and provide information that workstations, applications, and users need to communicate across the computer network. These services eliminate the need for each workstation or user to maintain its own copy of this information.

For example, a given workstation in a computer network requires the network address of other workstations in order to send messages. If there were no name service in the network, the workstation would have to store a file containing the addresses of all workstations, including itself. This file would also be stored on every other workstation in the network. In addition, each workstation would store duplicate files of other network-related information, such as mail information, security information, information about network services, and so on. As networks grow larger, the increasing amount of network information taxes the capacity of the workstations. Furthermore when the network changes, for example by adding or removing a workstation, the list of addresses and other network information must be updated on each workstation. This updating task becomes difficult in large networks.

Name services address this problem by providing a centralized source of network information that is accessible by the individual workstations. The information is stored on a server, which is connected to all workstations in the network. Generally the term "server" means a discrete host computer in a network, and it provides services to other computers, termed "clients". In short, the name service is a program running on a server host containing files of network-related information, such as a mapping of host names to network IP ("Internet Protocol") addresses of all computers in the network. The name service provides such mapping information to other computers and workstations upon request.

It should be noted that the term "server" conventionally has a second meaning. Typically in a distributed "client-server" computing environment, a "server" may be a program running on a particular host which provides network-related services, and this host may contain other server programs, and also be a client of still other servers. The term "server" is also used in this sense in the following description, as will be apparent from the context.

The name service provides several features to the computer network. First, it reduces the amount of overall space that must be devoted to storing network information. Secondly, it reduces the amount of effort required of a system administrator to update the network information to reflect changes in the network. A system administrator periodically updates the files in the name service on the server's host only, instead of all of the individual workstations. In addition, the name service provides greater flexibility and simplicity in handling the information itself. For example, the IP addresses in a network are numerical labels which are generally partly assigned by a system administrator and partly determined by the network topology. The name service allows one to translate a textual name of a host into its IP address. This mapping can be modified in software to reflect changes in the organization of the network components.

The name service stores the network address information in a file having the form of a map. The map is essentially a bi-column table that establishes a correspondence between textual names and the numerical addresses of the network components. The map can be used to search for the numerical address corresponding to a given name, or the names corresponding to a given numerical address. Similar maps may be used to store other network-related information.

In practice, the name service is normally replicated for purposes of reliability. The name service files are created in principal servers, or "master" servers, and are duplicated in backup servers, or "slave" servers. A client may utilize the name service by accessing any one of these servers.

The name service described above must be updated manually by an administrator at periodic intervals to keep track of changes in the network information. At each update session the administrator enters new information into the various maps on the master server. The administrator then propagates the modified maps to all of the slave servers; or the system may propagate the maps periodically on its own. This updating technique is satisfactory for networks that are not too large. However modern networks may have hundreds of servers supporting thousands of clients, and manual updating can be a time-consuming and arduous process. Furthermore in larger networks the network information changes occur more frequently. In short, the manual updating process for the name service encounters serious problems in a large network.

Automated name services have been designed to overcome the updating problem in large networks. These services are referred to as "dynamic" name services, to distinguish them from the "static" name services described above. Dynamic name services provide for incremental updates, in which programs directly update maps on the master server and in which only the changes in the name service data are sent to the slave servers from the master server, and these changes are automatically propagated. These dynamic name services have a different design from static name services. Thus, when a network outgrows the static name service, conversion to a dynamic service is often a major undertaking, and many large networks still utilize a static name service.

As discussed above, a name service can map a host name to a host IP address. A name service can also provide other mappings. For example, it can provide a client with access to a network-wide service, by mapping a textual name to a program number associated with that service (i.e. an integer). If the required service is available only on one host instead of all hosts, then the mapping becomes more complicated—mapping a textual name to a pair which consists of a host name and a program number. These are all examples of mappings that need updating only occasionally (for example, when a new host or service is added); the lack of automatic updating is not a serious problem.

If a particular host provides multiple instances of a service that differ in small ways (such as service instances that each provide access to one print server), then each instance may require its own program number. Program numbers are assigned from a fixed range of integers, divided into a static pool and a dynamic pool. A central authority, which is generally a person and may or may not be a system administrator, assigns program numbers from the static pool for programs to use permanently. A program can temporarily borrow program numbers from the dynamic pool. When a program terminates, its borrowed numbers are automatically returned to the dynamic pool.

Because the static range is finite and the number of service instances on a host is unknown but potentially large, the static pool solution has drawbacks. Such a solution would consume too many program numbers and would still have to use the dynamic pool if the number of service instances exceeded the number of program numbers assigned in a static manner.

The program numbers must come from the dynamic pool. Because it is impossible to assure that a service instance (e.g. a print server) has the same program number each time it starts, the name service must provide access to a service instance whose program number is continually changing. This changing program number requirement is easily satisfied in environments with a dynamic name service, but not in environments with a static name service. In short, it is desirable to provide dynamic behavior to a static name service.

SUMMARY OF THE INVENTION

An embodiment of the present invention provides a special program, termed a "proto-server", which carries out the dynamic association of program numbers with multiple servers in a network environment having a static name service. A proto-server is located on each host having a server needing dynamic naming in a static naming environment. When the host computer system is initially booted, the proto-server's tables are all purged. The proto-server may be started at boot time, or when a server registers with it if it is not currently running. As each server starts up, it registers its name, program number, and other information with the proto-server. The proto-server stores this information in a table or map, with each entry in the table comprising the name of a server and the corresponding complete address, or binding, of the server. The proto-server's table holds information that is similar to the information that a name table would hold in a dynamic name service. The name table residing in the proto-server is preferably stored persistently, so that this data remains when the proto-server shuts down. Thus, the information in the proto-server's name table is retained as long as the host system continues running.

Servers having stable bindings are registered in the name service with these bindings. However, servers operating in the dynamic mode are registered in the name service with the binding (including the program number) corresponding to the proto-server. When such a server starts up it finds an available dynamic program number for itself. The server then registers this number and other information with the proto-server. When a client requests the binding of the server and the name service returns the fixed binding of the proto-server, the client program then requests the proto-server to return the true binding of the server to the client. The operations with respect to the proto-server are preferably hidden from the client by means of an API (Application Program Interface) which maps a name to its actual program number. This enhancement by the proto-server allows multiple similar servers, or instances of a server, to run under a static name service, without requiring a dedicated pool of program numbers, or a complete upgrade of the service.

DETAILED DESCRIPTION OF THE PREFERRED EMBODIMENTS

Figure 1:
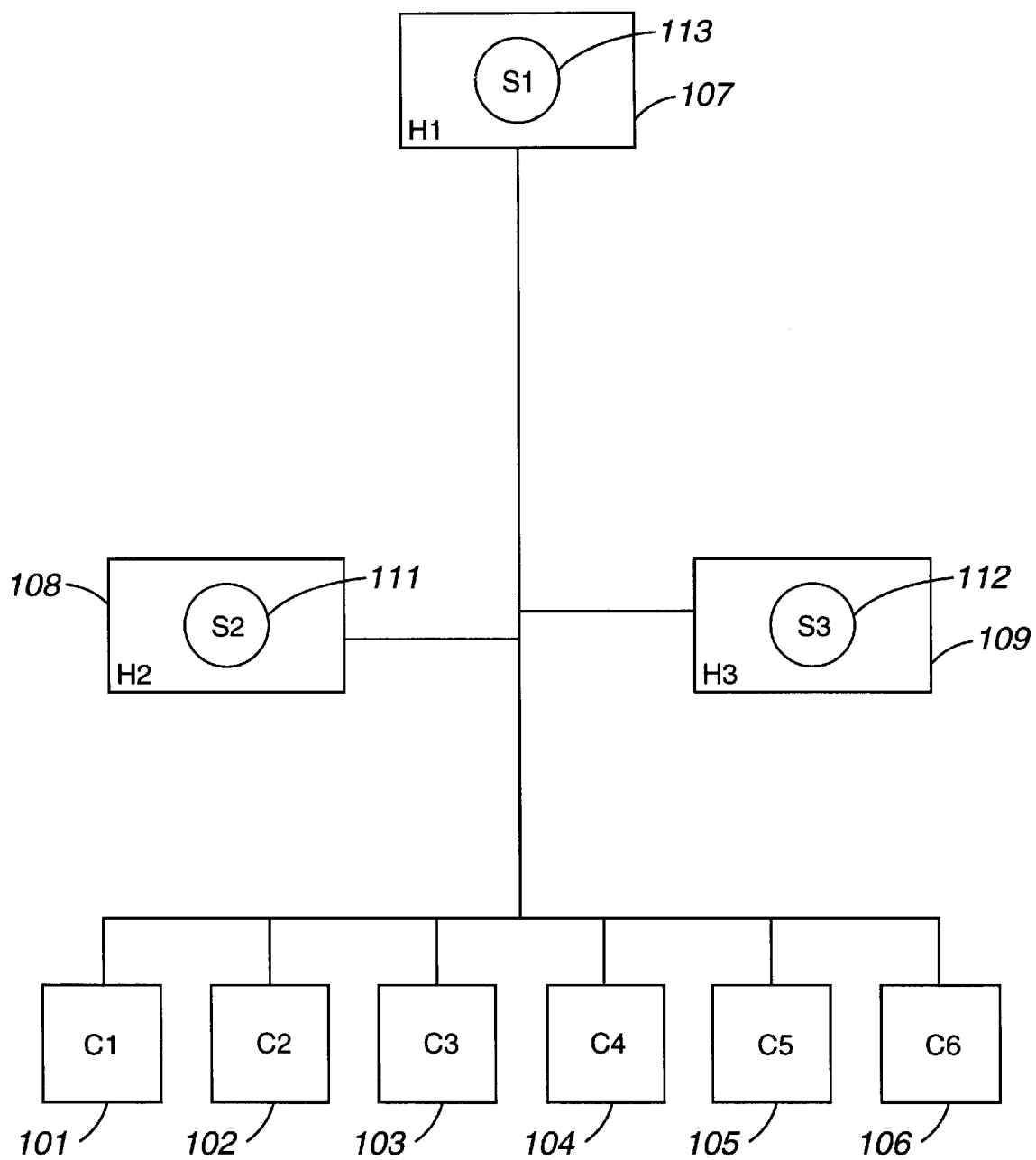
FIG. 1 is a block diagram of a simplified computer network in which a name service is utilized.

FIG. 1 is a block diagram of a simple computer network with nine hosts, comprising six workstations, 101, 102, 103, 104, 105, and 106, constituting clients C1–C6, and three server hosts, H1–H3 (107, 108, and 109). The network address of each workstation is a number; for example, the client C1 (101) has the network address 129.44.1.101, the client C2 (102) has the network address 129.44.1.102, and so on. The six workstations (101–106) and three server hosts (107–109) are all physically connected, as shown in the drawing. Three of the workstations, 101, 102, and 103, are logically connected to the host H2 108 for name service functions, which administers these three workstations using server program S2 111, and the other three workstations, 104, 105, and 106, are logically connected to the host H3 109 for name service functions, which administers these workstations using server program S3 112. These two hosts are in turn logically connected to the host H1 107 for name service functions, containing the server S1 113, and in this system the server S1 113 operates as a master server and administers servers S2 111 and S3 112 as slave servers.

FIG. 1 illustrates one example of a network environment in which a name service is utilized. All of the hosts and workstations have network addresses which are stored in a map by the name service. The name service may be implemented preferably in the name service sold by Sun Microsystems, Inc. under the label "NIS". This name service program resides on the master host H1 107, and the map may be represented as a bi-column table including the name of each host and workstation and the corresponding network address. An example of a portion of this map, greatly simplified for clarity, is shown in Table 1.

TABLE 1

| Name | Address |
|------|---------|
| C1 | 129.44.1.101 |
| C2 | 129.44.1.102 |
| C3 | 129.44.1.103 |
| C4 | 129.44.1.104 |
| C5 | 129.44.1.105 |
| C6 | 129.44.1.106 |
| H1 | 129.44.1.107 |
| H2 | 129.44.1.108 |
| H3 | 129.44.1.109 |

The map can further include the addresses of various components or objects in the network. Within a given host, each object has a program number that defines its identity to that host. The combination of this program number with the host network address gives the complete address, or binding, of the object. For example, the server S2 111 in the host H2 108 may have the program number 100004. The name service map may then include an entry:

| | | |
|---|---|---|
| S2 | 129.44.1.108 | 100004 |

Of course, a name service map could include other network-related information, such as mail information, security information, information about network services, and so on. Typically each map refers to a specific function. In a static name service, this information is all updated manually at periodic intervals by a network administrator. In the simplified system of FIG. 1, the master host H1 107 drives slave hosts H2 108 and H3 109, and the name service is replicated in these two slave hosts.

Figure 2:
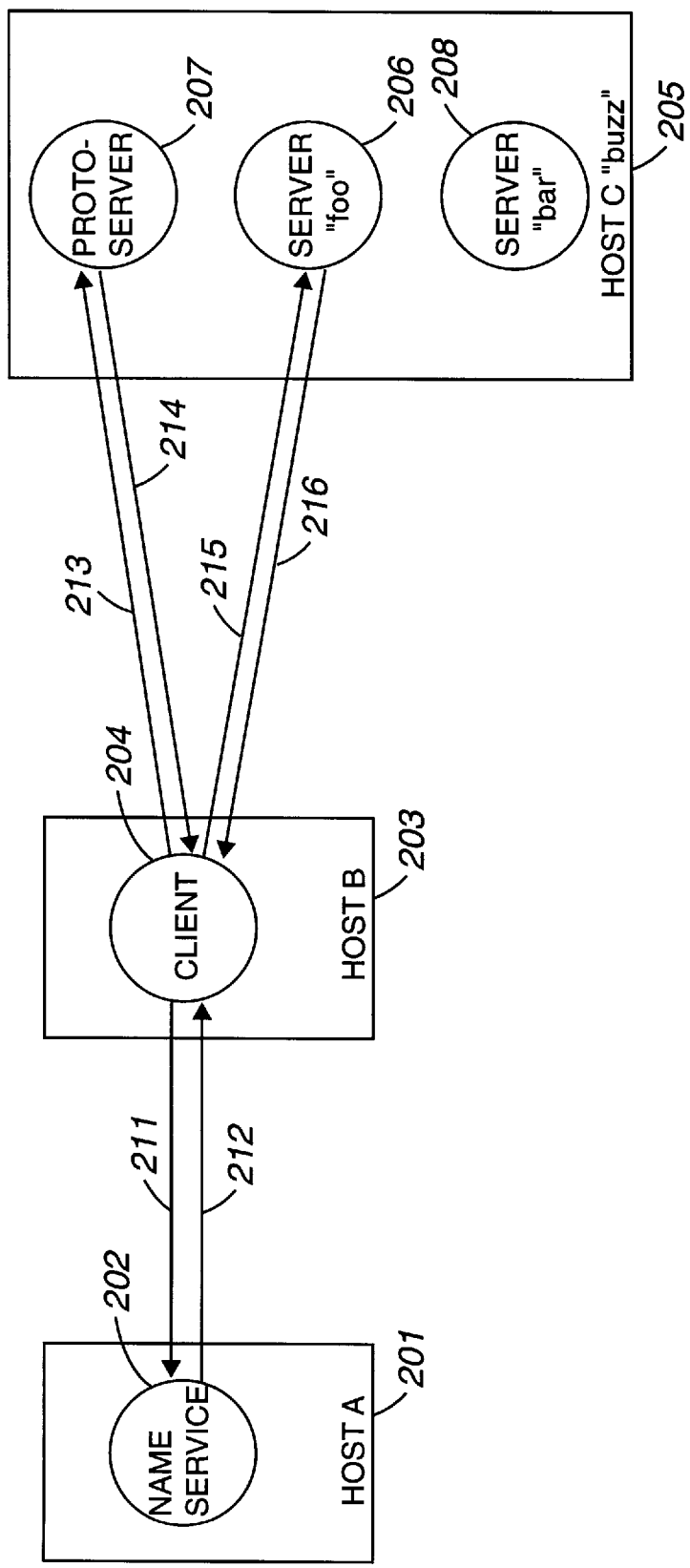
FIG. 2 is a block diagram of part of a computer network showing the operation of the present name service.

FIG. 2 is a block diagram of a portion of a computer network having a name service that is enhanced according to the present invention. The name service 202 resides on host A 201, which communicates with the host B 203 in which the client program 204 is running. Host C 205 contains a server "foo" 206, with program number 0x40000001 (hexadecimal notation), and server "bar" 208, with program number 0x40000004, both of which may be accessed by the client 204. The host C 205 also includes a proto-server program 207, which contains a name table mapping "foo" to 0x40000001 and "bar" to 0x40000004. The name service 202 contains a name service map with an entry which maps "foo" to the proto-server's fixed program number, termed "P" herein, and another entry which maps "bar" to "P" also.

The proto-server 207 may be started up during the initial boot process, or it may be started when a server registers a name binding with it and the proto-server is not running. Preferably the name table in the proto-server 207 is persistent and remains as long as the host operating system continues running. Thus, the name table survives shutdown of the proto-server 207, so that it is available when the proto-server 207 starts up again upon request from a server. When the host computer system is booted up, the proto-server 207 tables are purged. The name service 202 is unaffected by shutdown of the proto-server 207.

When a server instance starts up in a proto-server environment, as part of the boot process or otherwise, it finds an unused dynamic program number. If the name service binding for the server references the proto-server, then the server requests that the proto-server register the name of the server, its dynamic program number, and other information in the proto-server which adds this information to its name table. Conversely, if a server wants to delete its binding from the name service and this binding references the proto-server, then the server requests that the proto-server also delete its name from the proto-server name table.

Referring still to FIG. 2, when the client 204 requests a binding for a server "foo" 206, it sends this request 211 to the name service 202, and the name service 202 returns a binding 212. If this binding references a proto-server 207, then the client 204 sends this request to the proto-server 207, and the actual binding of the server instance 206 is returned 214 from the name table in the proto-server 207 to the client 204. This binding is used to access the server instance to carry out the requested operation. Alternatively, if the returned binding 212 does not reference the proto-server 207, then this binding is used to reference the server 206 directly, which carries out the operation requested by the client 216. This same procedure for handling client requests may be carried out with the server "bar" 208, and other similar servers in the host C 205.

Figure 3:
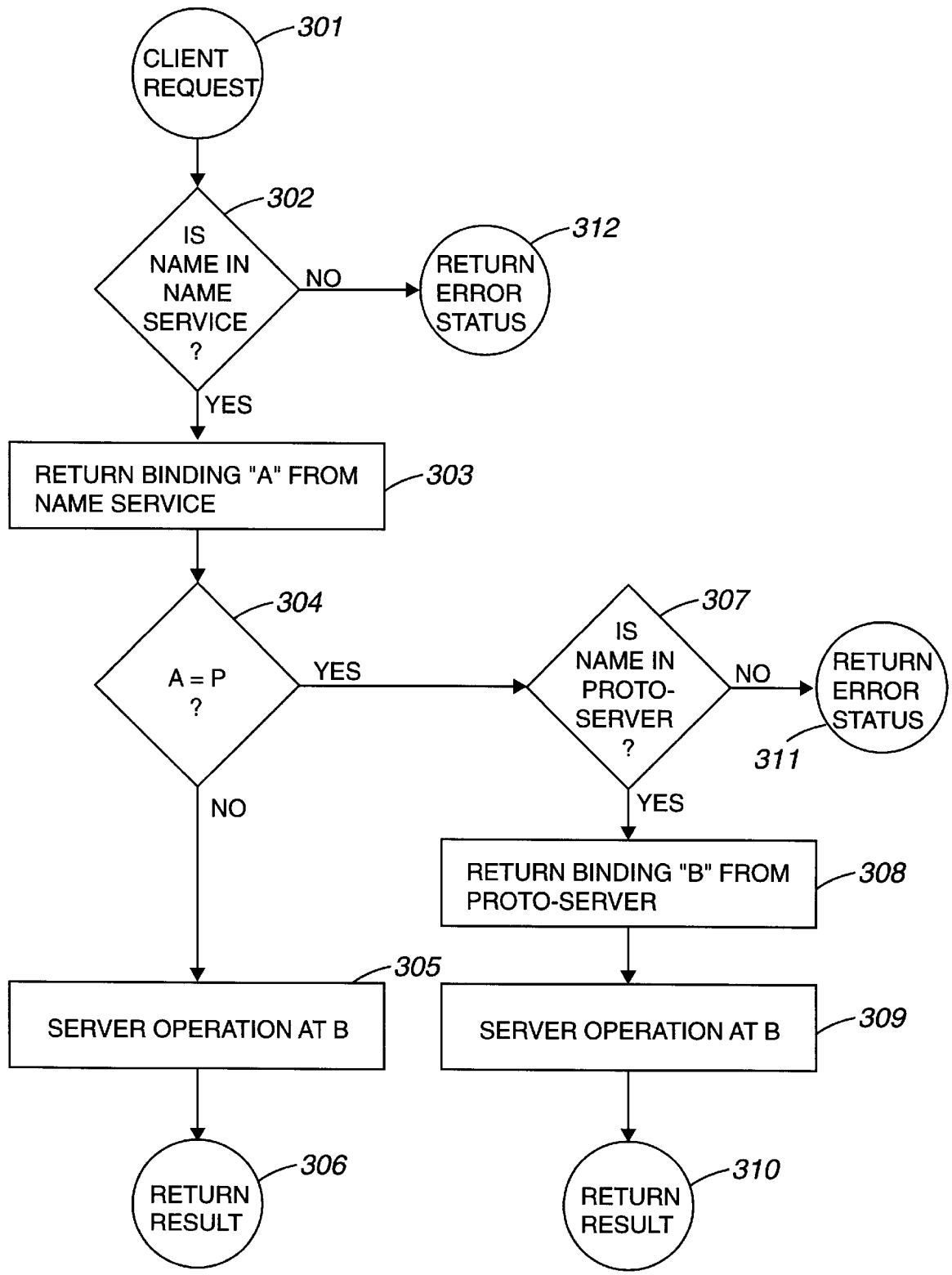
FIG. 3 is a flow chart illustrating the procedure by which the present name service administers servers.

FIG. 3 is a flow chart illustrating the above-described procedure for implementing a client request 301 for a server operation. Initially the client requests the server by sending a name to the name service 302. The name service 302 tests its map to determine whether the name is registered. If not, the name service returns an error status message 312 to the client indicating that the request cannot be carried out. Otherwise the name service returns a binding 303, which we denote here as "A", corresponding to this name. The system then checks this binding 304 to test whether it is a proto-server type binding, i.e. whether its program number is the program number "P" of the proto-server, or alternatively, whether the binding "A" includes some symbol or string which designates the proto-server. If not, the server operation is performed with the binding "A" 305, and the result is returned 306 to the client. If the test 304 determines that the binding "A" is a proto-server binding, then the name is sent to the proto-server 307. The proto-server checks its name table to determine whether this name is registered 307. If not, the proto-server returns an error status message 311 to the client indicating that the request cannot be carried out. Otherwise, the proto-server returns a binding "B" 308 corresponding to this name. The server operation is carried out with this binding "B" 309, and the result is returned 310 to the client.

From the above description, it will be apparent that the proto-server 207 must be capable of executing several commands in managing the name table. First, it must include a GET operation, which returns the value of a binding for a given name. There must also be an ADD command, which adds the binding for a given name to the name table. Finally the proto-server must be able to execute a DELETE command, which deletes the binding for a given name from the name table. In some embodiments it is desirable to include also in the proto-server a GETALLNAMES command, which retrieves the entire contents of the name table.

The operations of the proto-server are carried out preferably automatically in conjunction with the name service. For example, referring again to FIG. 2, suppose that the host C 205 is assigned the name "bazz" in the name service 202, and suppose further that the client 204 issues requests to two server instances, named "foo" and "bar", running on the host "bazz" 205. We assume also that the proto-server 207 is assigned the fixed program number 105004 in the name service 202. Then, if these server instances are handled by the proto-server 207, the name service may contain the address "bazz,105004" for both "foo" and "bar". The name table in the proto-server 207 will contain program numbers that are dynamically assigned for these two instances. For example, we suppose that "foo" has the number 0x40000001, and "bar" is assigned the number 0x40000004. The client request to "foo" is then directed to the binding "bazz,0x40000001", and the request to "bar" will obtain the binding "bazz,0x40000004". In short, the entire operation of the proto-server is invisible from the standpoint of the client. The program numbers for "foo" and "bar" are dynamically assigned and may be updated by the system, without affecting any client operations. Thus, the net effect of the proto-server is to enhance the static name service to operate as if it were a dynamic name service in processing client requests.

A further advantage arises from the provision that each proto-server only administers servers on the local host. The name table in a proto-server only contains entries for servers instantiated on the same host as the proto-server. This makes it unnecessary to keep multiple name tables updated on different hosts. This feature also obviates the situation where a server on one host becomes inaccessible because the proto-server resides on another host which undergoes a failure; i.e. the system avoids the "propagation of crashes".

The foregoing description has been cast in terms of a name service for dynamic processing of client requests to servers. Clearly, however, the invention is not limited to this context, and it may be practiced for dynamic processing of client requests to other types of objects, i.e. instances of programs that do not necessarily perform only network-related services, but that require dynamic assignment of program numbers.

Furthermore, the name service and proto-server have been described as programs running on various hosts. However these programs may be embodied in disks or other storage media and loaded into their respective hosts.

The foregoing description of the preferred embodiments of the invention has been presented for purposes of illustration and description, and is not intended to be exhaustive or to limit the invention to the precise forms disclosed. Many modifications and variations of the invention are possible in light of the above teaching. It is intended that the spirit and scope of the invention are to be defined by reference to the following claims, along with their full scope of equivalents.

What is claimed is:

1. In a computer network having interconnected hosts, a name service system comprising:

a first host running a first program containing a first file, the first file including names of objects running in the network, wherein for a particular one of said object names, the first file further includes a first network address corresponding to said particular object name; and for each of said objects, a second host interconnected with said first host, said second host further running a second program containing a second file including said names of objects running in the network, and for a selected one of said object names, the second file further includes a second network address corresponding to said selected object name, wherein said first network address that corresponds to said particular object name includes a designation identifying said second program on said second host.

2. A system as recited in claim 1, wherein said second file contains only names of objects running on said second host.

3. A system as recited in claim 2 wherein the second file is a name table, and the names of objects running on the second host are entries for servers instantiated on the second host.

4. A system as recited in claim 1, wherein said designation included in the first network address that corresponds to said particular object name is the network address of said second program on said second host.

5. A system as recited in claim 1, wherein said second file is retained when said second host is shut down.

6. A system as recited in claim 5, wherein said second file is purged when said second host is booted up.

7. A system as recited in claim 1, further comprising:

a third program running on one of said interconnected hosts, said third program being communicative with clients running on said hosts, such that upon request from one of said clients for the network address of an object, said third program determines whether the network address of said object in said first file designates said second program, and when it is determined that said object in said first file designates said second program, said second program returns to said client the network address of said object from said second file.

8. A system as recited in claim 1, wherein the network addresses in said second file may be dynamically updated.

9. A system as recited in claim 8, wherein upon startup of an object, said object registers a dynamic program number in said second file.

10. A system as recited in claim 1, wherein the operation of said second program is hidden from a client requesting name service from said first program.

11. A system as recited in claim 1 wherein the first host continues to run the first program when the second host ceases running the second program.

12. A computer system including a plurality of interconnected hosts and a name information service system, the computer system comprising:

a first host arranged to run a first program containing a first file including names of objects running on the computer system, wherein the first file further includes a first network address corresponding to each of said object names;

for each of said objects, a second host interconnected with said first host, said second host being arranged to run a second program containing a second file including names of objects running on the computer system, wherein the second file further includes a second network address corresponding to each of said object names, said first network address for at least one of said objects including a designation identifying said second program on said second host; and a method for returning the network address of a particular object upon request from a client in the computer system, said method being arranged to determine whether the network address of said particular object in said first file designates said second program on said second host, return to said client the network address of said particular object from said second file when said network address of said particular object in said first file designates said second program on said host, and return to said client the network address of said particular object from said first file when said network address of said particular object in said first file does not designate said second program on said host.

13. A computer readable storage medium containing encoded data for use in a computer network having a plurality of interconnected hosts, said computer network including a name information service system, the computer readable storage medium comprising:

program code that enables a first host to run a first application containing a first file including names of objects running in the network, wherein for a particular one of said object name, the first filed includes a first network address corresponding to said particular object name; and for each of said objects, program code that enables a second host interconnected with said first host to run a second application containing a second file comprising names of objects running in the network, wherein for said particular object name, said second file further includes a second network address corresponding to said particular object, said first network address including a designation identifying said second application on said second host, said data comprising an application for causing said computer network to perform a method for returning the network address of an object upon request from a client in the computer network, said method comprising the steps of:

determining whether the network address of said object in said first file designates said second program on said second host;

when said network address of said object in said first file designates said second program on said second host, returning to said client the network address of said object from said second file; and when said network address of said object in said first file does not designate said second program on said second host, returning to said client the network address of said object from said first file.

14. A computer readable storage medium containing encoded data for use in a computer network having a plurality of interconnected hosts, said network further having a name information service system, the computer readable storage medium comprising:

encoded data that enables a first host to run a first program containing a first file comprising names of objects running in the computer network, and for each of said object names, the first file further comprises a first network address corresponding to said object name;

encoded data that enables a second host interconnected with said first host to run a second program for each of said objects containing a second file comprising names of objects running in the computer network, wherein for each of said object names, the second file further comprises a second network address corresponding to said object, the first network address including a designation identifying said second program on said second host.

15. A computer program product for use in a computer network having a plurality of interconnected hosts and a name information service system, the computer program product comprising:

computer code that embodies a first program containing a first file comprising names of objects running in the computer network, wherein for each of said object names, the first file further comprises a first network address corresponding to said object name;

computer code that causes a first host to run the first program;

computer code that embodies a second program containing a second file comprising names of objects running in the computer network, wherein for each of said object names, the second program further comprises a second network address corresponding to said object;

computer code that causes a second host interconnect with said first host to run the second program, wherein said first network address includes a designation identifying said second program on said second host; and a computer readable medium that contains the computer codes.

16. A computer-implemented method for implementing a name service system on a networked computing system, the networked computing system including a first host and a second host, wherein the first host is interconnected with the second host, the method comprising:

executing a first program on the first host, the first program including a first file, the first file including names of objects running in the networked computing system, wherein for at least a particular one of the object names, the first file further includes a first network address that corresponds to the particular one of the object names; and executing a second program on the second host, the second program including a second file, the second file including names of objects running in the networked computing system, the second file further including a second network address that corresponds to a selected one of the object names, wherein the first network address that corresponds to the particular one of the object names includes a designation identifying the second program.

17. A computer-implemented method as recited in claim 16 wherein the second file is arranged to include substantially only names of objects running on the second host.

18. A computer-implemented method as recited in claim 17 wherein the second file is a name table, and the names of objects running on the second host are entries for servers instantiated on the second host.

* * * * *